United States Patent
Cipullo et al.

(10) Patent No.: US 11,002,573 B2
(45) Date of Patent: May 11, 2021

(54) OPTICAL SENSOR SYSTEM

(71) Applicant: AIRBUS OPERATIONS LIMITED, Bristol (GB)

(72) Inventors: Alessio Cipullo, Bristol (GB); Kayvon Barad, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 16/408,633

(22) Filed: May 10, 2019

(65) Prior Publication Data

US 2019/0346296 A1 Nov. 14, 2019

(30) Foreign Application Priority Data

May 11, 2018 (GB) .................................. 1807677

(51) Int. Cl.
*G01D 5/353* (2006.01)
*G02B 6/293* (2006.01)

(52) U.S. Cl.
CPC ..... *G01D 5/35387* (2013.01); *G01D 5/35316* (2013.01); *G01D 5/35383* (2013.01); *G02B 6/2932* (2013.01); *G02B 6/29319* (2013.01)

(58) Field of Classification Search
None
See application file for complete search history.

(56) References Cited

U.S. PATENT DOCUMENTS

| 5,426,297 A * | 6/1995 | Dunphy ............. G01D 5/35383 250/226 |
| 5,444,803 A | 8/1995 | Kim et al. |
| 5,608,825 A * | 3/1997 | Ip ........................ G02B 6/2932 385/24 |
| 5,680,489 A | 10/1997 | Kersey |
| 5,754,718 A * | 5/1998 | Duck .................. G02B 6/2932 385/102 |
| 5,841,918 A * | 11/1998 | Li ....................... G02B 6/2932 385/24 |
| 6,281,997 B1 * | 8/2001 | Alexander ......... G02B 6/12019 398/87 |

(Continued)

FOREIGN PATENT DOCUMENTS

| CN | 2 605 705 | 3/2004 |
| GB | 2 332 272 | 6/1999 |

(Continued)

OTHER PUBLICATIONS

Georges Kouroussis et al, "Edge-Filter Technique and Dominant Frequency Analysis for High-Speed Railway Monitoring With Fiber Bragg Gratings", Smart Mater. Struct. 25 (2016) 075029, 7 pages.

(Continued)

*Primary Examiner* — Michael Stahl
(74) *Attorney, Agent, or Firm* — Nixon & Vanderhye P.C.

(57) ABSTRACT

An optical sensor system with two or more optical sensors; two or more receivers; and an optical de-multiplexing system. Each optical sensor includes a fibre grating with a different wavelength characteristic. Each receiver includes a slope filter and a light detector and is associated with a respective one of the optical sensors. The optical de-multiplexing system is arranged to route light from each of the optical sensors to its associated receiver based on a wavelength of the light.

19 Claims, 7 Drawing Sheets

(56) References Cited

U.S. PATENT DOCUMENTS

| | | | |
|---|---|---|---|
| 7,512,291 B2* | 3/2009 | Mendoza | G01D 5/35383 |
| | | | 385/10 |
| 2004/0113055 A1* | 6/2004 | Whelan | G01L 1/246 |
| | | | 250/227.18 |
| 2017/0057659 A1 | 3/2017 | Wood et al. | |
| 2017/0067928 A1 | 3/2017 | Wood et al. | |
| 2019/0086244 A1* | 3/2019 | Deliwala | G01D 5/35316 |

FOREIGN PATENT DOCUMENTS

| | | |
|---|---|---|
| WO | 02/090893 | 11/2002 |
| WO | 2008/028138 | 3/2008 |
| WO | 2013/166407 | 11/2013 |

OTHER PUBLICATIONS

European Search Report cited in EP 19173499 .6 dated Oct. 22, 2019, 10 pages.
Seiichi Onoda, et al., "Delayed Transmission/Reflection Ratiomaric Reflectometry", 20th International Conference on Optical Fibre Sensors, Proc. of SPIE, vol. 7503, 750332-3 (2009) 4 pages.
Combined Search and Examination Report for GB1807677.8 dated Nov. 21, 2018, 8 pages.
European Search Report cited in 19 173 499.5 dated Jun. 4, 2020, 8 pages.
Sanjeev Dewra et al, "Advanced Engineering Technology and Application Fabrication and Applications of Fiber Bragg Grating—A Review", XP055699626, 11 pages.
"Getting to Know Optical Circulator", Oct. 28, 2016, XP055699636, URL:http://www.fiber-optical-networking.com/getting-know-optical-circulator.html, 5 pages.

* cited by examiner

OPTICAL SENSOR SYSTEM

RELATED APPLICATION

This application claims priority to United Kingdom Patent Application GB1807677.8 filed May 11, 2018, the entire contents of which us incorporated by reference.

FIELD OF THE INVENTION

The present invention relates to an optical sensor system.

BACKGROUND OF THE INVENTION

Optical sensors have a number of benefits, including Electro Magnetic Interference (EMI) immunity, light weight, low loss in long fibres, and high accuracy.

The technologies for interrogating multiple sensors have problems. For example a swept laser may be used, but this is limited by sweep speed, and needs a high performance microprocessor to do the necessary Fast Fourier Transform (FFT) algorithms. Alternatively, a simple while light source may be used in combination with a complex spectral sensor and algorithms.

SUMMARY OF THE INVENTION

A first aspect of the invention provides a wavelength-division multiplexing optical sensor system comprising two or more optical sensors; two or more receivers; and an optical de-multiplexing system.

Each optical sensor comprises a fibre grating with a different wavelength characteristic, and the wavelength characteristics of the sensors are different from each other. For instance the wavelength characteristic of each fibre grating may be a wavelength, or a range of wavelengths, which are reflected by the fibre grating. Preferably the wavelength characteristic of each fibre grating is a range of wavelengths which are reflected by the fibre grating, and none of the ranges of the fibre gratings overlap with each other.

Each receiver is associated with a respective one of the optical sensors, and the optical de-multiplexing system is arranged to route light from each of the optical sensors to its associated receiver based on a wavelength of the light. Typically the optical de-multiplexing system is arranged to receive light from all of the optical sensors via a single channel, which may be an optical fibre or waveguide for example.

In one embodiment, the optical de-multiplexing system consists of a single de-multiplexer which receives light from the optical sensors on a single channel (for example an optical fibre) and routes light from each of the optical sensors to its associated receiver based on a wavelength of the light. In another embodiment, the optical de-multiplexing system comprises a cascaded topology of de-multiplexers which each split light from some or all the optical sensors into two separate paths based on a wavelength of the light. In another embodiment the optical de-multiplexing system comprises one or more drop de-multiplexers, wherein each drop de-multiplexer is tuned to the wavelength characteristic of an associated one of the optical sensors and arranged to route light with that wavelength characteristic to the receiver associated with that optical sensor. For instance each drop de-multiplexer may be tuned to a wavelength, or range of wavelengths, which are reflected by the associated one of the optical sensors.

Typically the optical de-multiplexing system comprises two, three or more drop de-multiplexers which are tuned to different wavelength characteristics. The optical de-multiplexing system may comprise two or more drop de-multiplexers arranged in series, wherein each drop de-multiplexer is tuned to the wavelength characteristic of an associated one of the optical sensors and arranged to route light with that wavelength characteristic to the receiver associated with that optical sensor. Most preferably the optical de-multiplexing system comprises three or more drop de-multiplexers arranged in series in a chain.

As a minimum the system may have only two optical sensors and one drop de-multiplexer. More generally there may be N optical sensors and N−1 de-multiplexers. However more preferably the number of optical sensors is the same as the number of drop de-multiplexers (in other words, there are N optical sensors and N de-multiplexers). This is more preferred because the last drop de-multiplexer in the chain can compensate the line losses without bias due to unintended reflections outside of the expected wavelength band.

Typically the (or each) drop de-multiplexer comprises a circulator with a first port arranged to receive light from the optical sensors, a second port coupled to the associated one of the receivers, and a third port coupled to a de-multiplexer fibre grating.

Optionally the (or each) drop de-multiplexer comprises a de-multiplexer fibre grating tuned to the wavelength characteristic of an associated one of the optical sensors, typically arranged to reflect or transmit light with that wavelength characteristic.

Each receiver comprises a slope filter, and a light detector such as a photodiode. The slope filter effectively converts from wavelength to intensity, so the output of the light detector is related to the wavelength of the light routed to the receiver.

Each slope filter may attenuate light based on a wavelength of the light and a wavelength gain function, which may be linear or non-linear.

Optionally all of the slope filters have identical wavelength gain functions.

Optionally each slope filter is tuned to the wavelength characteristic of a respective one of the optical sensors and the slope filters are tuned to different wavelength characteristics—for instance the wavelength gain functions may have different passbands. This is preferred since it enables the wavelength gain functions to have a steeper gradient which improves the sensitivity of the receiver. Thus, different slope filters can have different passband characteristics and different gradients, each corresponding to an expected sensor characteristic.

Typically the wavelength gain function of each slope filter is an infective or one-to-one function.

Optionally each receiver comprises a reference light sensor, and a beam splitter. The beam splitter is arranged to: split light routed to that receiver (optionally received by the beam splitter from a dedicated de-multiplexer) into a reference beam and a measurement beam, direct the reference beam onto the reference light sensor of that receiver, and direct the measurement beam onto the light detector of that receiver via its respective slope filter.

The output of the reference light sensor can then be used to generate a compensated output. Typically each receiver further comprises compensation circuitry which is arranged to generate a compensated output based on an output of the light detector of that receiver and an output of the reference light sensor of that receiver. The compensation circuitry may be digital, but more preferably it is analogue.

The system typically comprises a light source arranged to generate light; and an interrogation optical fibre arranged to transmit the light from the light source to the optical sensors. The light source may be a wideband light source. Optionally the optical sensors are connected in series to the light source.

The light source may be arranged to generate light with a pulsed or otherwise modulated intensity, but more preferably the light source is arranged to continuously generate light with a substantially constant intensity (i.e. varying by no more than 50%, no more than 10% or no more than 5%), and the interrogation optical fibre is arranged to continuously transmit the light with a substantially constant intensity from the light source to the optical sensors. This enables continuous readings to be taken from the sensors.

Preferably each receiver generates an analogue output. Optionally the system further comprises an analogue to digital converter arranged to convert the analogue outputs of the receivers to digital outputs.

A further aspect of the invention provides an aircraft comprising a sensor system according to the first aspect.

A further aspect of the invention provides a control system comprising: a motor or actuator; a sensor system according to the first aspect of the invention arranged to monitor or measure the motor or actuator and generate a feedback signal; and a controller arranged to control operation of the motor or actuator based on the feedback signal.

BRIEF DESCRIPTION OF THE DRAWINGS

Embodiments of the invention will now be described with reference to the accompanying drawings, in which:

FIG. 5b shows the outputs of the three FBG sensors of FIG. 5a;

DETAILED DESCRIPTION OF EMBODIMENT(S)

Figure 1:
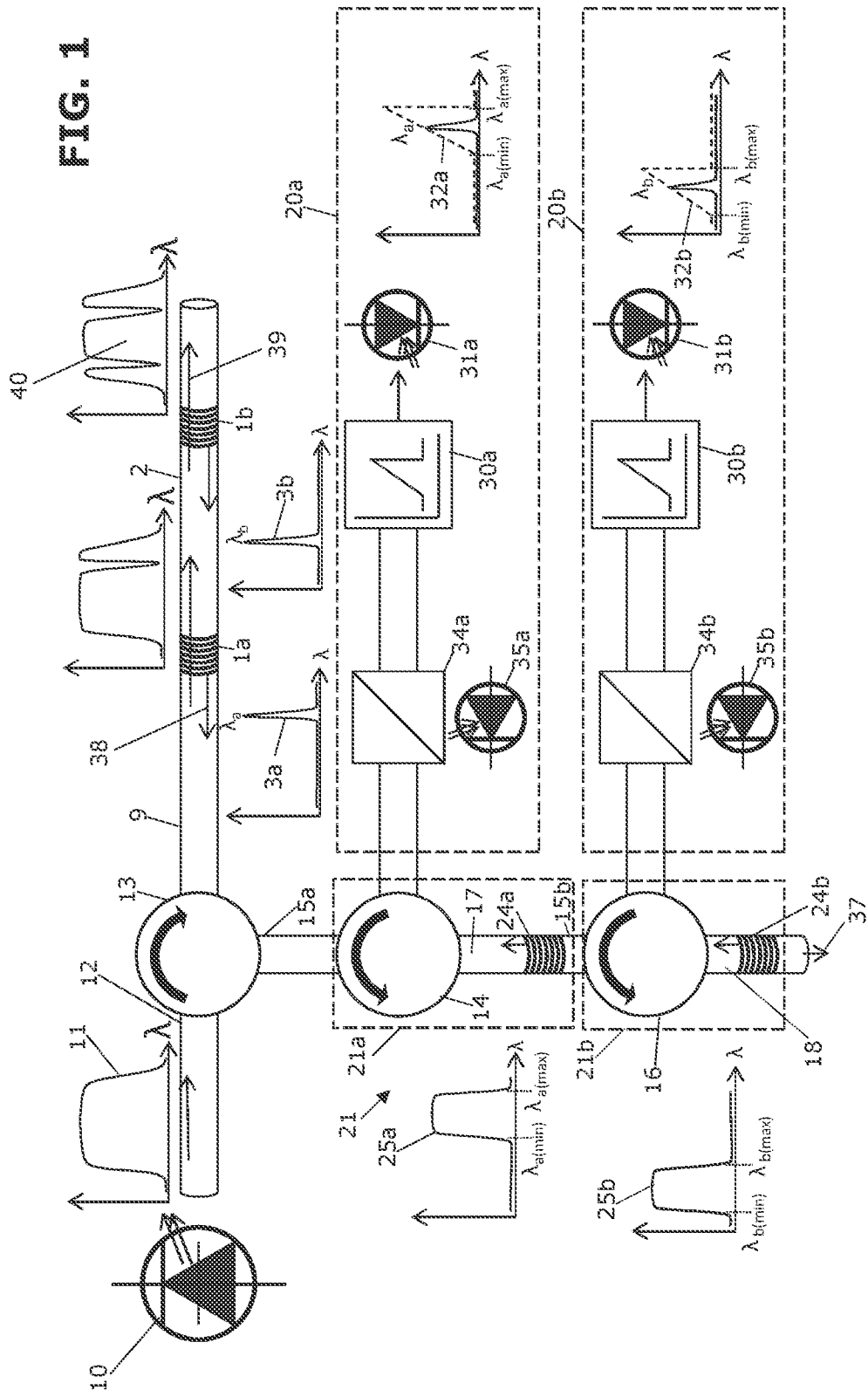
FIG. 1 shows a wavelength-division multiplexing optical sensor system.

A wavelength-division multiplexing optical sensor system according to a first embodiment of the invention is shown in FIG. 1. The system comprises a pair of fibre Bragg grating (FBG) sensors 1a, 1b connected by a linking optical fibre 2. Each FBG sensor has a different wavelength characteristic which is dictated by the grating spacing of the FBG. In this case the first FBG sensor 1a reflects light with a narrow band of wavelengths which is ideally a single wavelength $\lambda a$ (as indicated by reflectance peak 3a) and the second FBG sensor 1b reflects light with a narrow band of wavelengths which is ideally a single wavelength $\lambda b$ (as indicated by reflectance peak 3b). The wavelength of light reflected by the FBG sensors 1a, 1b is proportional to the grating spacing, so any deviation from this spacing will cause the wavelength of the reflected light to vary. This property of the FBG sensors 1a, 1b, enables them to sense strain, temperature, pressure, or other parameters.

The wavelength $\lambda a$ of the light from the first FBG sensor 1a varies within a small range when a sensed parameter (for example pressure or temperature) changes, but it never falls outside a reflectance band $\lambda a(min)$ to $\lambda a(max)$ which is a unique wavelength characteristic of the sensor 1a.

Similarly, the wavelength $\lambda b$ of the light from the second FBG sensor 1b varies within a small range when a sensed parameter (for example pressure or temperature) changes, but it never falls outside a reflectance band $\lambda b(min)$ to $\lambda b(max)$ which is a unique wavelength characteristic of the sensor 1b.

A broadband/white light source 10 is arranged to continuously generate light with a substantially constant intensity (i.e. not pulsed or otherwise intensity-modulated). The light has a broad spectrum 11.

The light source 10 may be a light emitting diode (LED), quartz halogen filament lamp, or a white light or multi-band laser diode such as a multiple quantum well laser diode. Technically any light source can be used although an LED or laser diode is preferable.

A light source optical fibre 12 is arranged to continuously transmit the white light with a substantially constant intensity from the light source 10 to the optical sensors 1a, 1b via a first circulator 13 and an interrogation optical fibre 9. The optical sensors 1a, 1b are connected in series to the light source 10 and receive the white light from the light source with a substantially constant intensity (i.e. not pulsed or otherwise intensity-modulated). After the last optical sensor 1b in the chain, any remaining light 39 can be absorbed by a non-reflective termination (not shown). This prevents any light remaining in the fibre after the optical sensors negatively affecting the system.

A third port of the first circulator 13 is connected to a pair of receivers 20a, 20b via an optical fibre 15a and an optical de-multiplexing system 21 comprising a pair of drop de-multiplexers 21a, 21b arranged in series in a chain. The optical de-multiplexing system 21 is arranged to receive light 38 reflected from all of the optical sensors via a single optical fibre 15a.

Each drop de-multiplexer 21a, 21b is tuned to the wavelength characteristic of an associated one (and only one) of the FBG sensors 1a, 1b and arranged to route light with that wavelength characteristic to an associated one of the receivers 20a, 20b.

The first drop de-multiplexer 21a comprises a first de-multiplexer fibre grating 24a which is tuned to the wavelength characteristic $\lambda a(min)$ to $\lambda a(max)$ of the first FBG 1a and arranged to reflect light with that wavelength characteristic back to a second circulator 14. The second circulator has a first port coupled to the optical fibre 15a, a second port coupled to the first receiver 20a, and a third port coupled to the first de-multiplexer fibre grating 24a via an optical fibre 17.

Similarly, the second drop de-multiplexer 21b comprises a second de-multiplexer fibre grating 24b which is tuned to the wavelength characteristic $\lambda b(min)$ to $\lambda b(max)$ of the second FBG 1b and arranged to reflect light with that wavelength characteristic back to a third circulator 16. The third circulator 16 has a first port coupled to the first fibre grating 24a via an optical fibre 15b, a second port coupled to the second receiver 20b, and a third port coupled to the second de-multiplexer fibre grating 24b via an optical fibre 18.

The tuning of the drop de-multiplexers 21a, 21b is indicated by drop bands 25a, 25b. The first de-multiplexer fibre grating 24a has a grating spacing which is selected so that it reflects light in a drop band 25a from λa(min) to λa(max). This drop band 25a coincides with the reflectance band of the first FBG sensor 1a so that it includes the wavelength λa of the light from the first FBG sensor 1a and excludes the wavelength λb of the light from the second FBG sensor 1b. The wavelength λa of the light from the first FBG sensor 1a varies within a small range when a sensed parameter (for example pressure or temperature) changes, but it never falls outside the drop band 25a of the de-multiplexer 21a. Similarly, the second de-multiplexer fibre grating 24b has a grating spacing which is selected so that it reflects light in a drop band 25b from λb(min) to λb(max). This drop band 25b coincides with the reflectance band of the first FBG sensor 1a so that it includes the wavelength λb of the light from the second FBG sensor 1b and excludes the wavelength λa of the light from the first FBG sensor 1a. The wavelength λb of the light from the second FBG sensor 1b varies within a small range when a sensed parameter (for example pressure or temperature) changes, but it never falls outside the drop band 25b of the de-multiplexer 21b.

The drop bands 25a, 25b of the de-multiplexers 21a, 21b are separate and non-overlapping, so that λa(min)≥λb(max).

In summary, each drop de-multiplexer 21a, 21b is tuned to the wavelength characteristic of an associated one of the sensors 1a, 1b and arranged to route light with that wavelength characteristic from a respective optical fibre 15a, 15b to an associated one of the receivers 20a, 20b.

FIG. 1 shows only two optical sensors 1a, 1b (and associated drop de-multiplexers 21a, 21b) but in a typical design a significant number of optical sensors (>30) is possible (each with an associated drop de-multiplexer in the chain) as long as there is little or no overlap in their reflectance bands. So any remaining light 37 continues to the next drop de-multiplexer not (shown) in the chain.

Each receiver 20a, 20b comprises a slope filter 30a, 30b and a photodiode 31a, 31b. Each slope filter 30a, 30b is tuned to the wavelength characteristic of a respective one of the FBG sensors 1a, 1b and the slope filters are tuned to different wavelength characteristics. Each slope filter attenuates light based on a wavelength of the light and a wavelength gain function 32a, 32b which defines a passband of the slope filter. Like the drop bands of the de-multiplexers 21a, 21b, the passbands of the slope filters 30a, 30b are separate and non-overlapping.

The wavelength gain function 32a of the first slope filter 30a is an injective or one-to-one function which varies from a minimum at the bottom λa(min) of the drop band 25a of the first de-multiplexer 21a up to a maximum at the top λa(max) of the drop band 25a of the first de-multiplexer 21a. In this example the wavelength gain function 32a is linear.

Similarly the wavelength gain function 32b of the second slope filter 30b is an injective or one-to-one function which varies from a minimum at the bottom λb(min) of the drop band 25b of the second de-multiplexer 21b up to a maximum at the top λb(max) of the drop band 25b of the second de-multiplexer 21b. In this example the wavelength gain function 32b is also linear.

It can be seen from FIG. 1 that λa(min) of the wavelength gain function 32a is greater than λb(max) of the wavelength gain function 32b. The slope filters 30a, 30b, may have passbands which coincide with the drop bands of the corresponding de-multiplexors 21a, 21b.

The wavelength gain functions 32a, 32b, of the slope filters 30a, 30b, are used to identify the wavelengths of the light reflected by the FBG sensors 1a, 1b. The wavelength gain functions 32a, 32b give a one-to-one mapping of wavelength to intensity, so the output of the photodiode 31a, 31b gives an indication of the wavelength of the light routed to the receiver 20a, 20b. In other words, each slope filter attenuates the signal based on its wavelength—transforming the "wavelength modulated" return signal from the FBG sensor 1a, 1b into an "intensity modulated" signal.

In the case of FIG. 1, each slope filter 30a, 30b is tuned to the wavelength characteristic of a respective one of the optical sensors and the slope filters are tuned to different wavelength characteristics. This is preferred, since it enables the wavelength gain functions 32a, 32b to have a steep gradient and thus high sensitivity. In an alternative embodiment of the invention, all of the slope filters 30a, 30b may have identical wavelength gain functions, but in this case the passbands of the slope filters will need to be wide enough to cover all of the FBG sensors, and as a consequence the gradient of the wavelength gain function will need to be more shallow and hence less sensitive (resulting in reduced accuracy or higher tendency to noise after conversion to electrical signals by the photodiode 31a, 31b).

It is difficult to differentiate between a signal that has high losses (due to attenuation in the optical fibres and/or other components in the optical path) or a signal that has been attenuated by a slope filter. To improve accuracy of the sensor measurement, each receiver 20a, 20b includes a compensation system including a beam splitter 34a, 34b, a reference light sensor 35a, 35b and compensation circuitry 50 which is omitted in FIG. 1 (for purposes of clarity) but shown in FIG. 2.

Each beam splitter 34a, 34b is arranged to split the light routed to the receiver 20a, 20b via the de-multiplexer 21a, 21b into a reference beam with intensity $I_{ref}$ and a measurement beam with intensity $I_{sig}$. The reference beam is directed onto the reference light sensor 35a, 35b which may be a photodiode for example. The measurement beam is directed onto the photodiode 31a, 31b via its respective slope filter 30a, 30b.

By comparing the outputs of the photodiodes 31a, 31b and the reference light sensors 35a, 35b, a compensated output is calculated which more accurately represents the wavelength of the light reflected by the FBG sensor 1a, 1b. This compensation can correct measurements in the case that the spectrum 11 of the white light source 10 is not constant across all wavelengths. For example, if the white light source 10 produced a higher intensity of light at the wavelength corresponding to the first optical sensor 1a when compared to the second optical sensor 1b, then without compensation it could appear that the readings are different when in reality they could be sensing the same conditions. Similarly, if the optical fibre 2 is very long then fibre attenuation would make the intensity from optical sensor 1b less than the intensity from optical sensor 1a, and compensation solves this problem.

Compensation can be done continuously and dynamically in case there is variability in quality of the signal over time. This allows for higher accuracy compensation.

Figure 2:
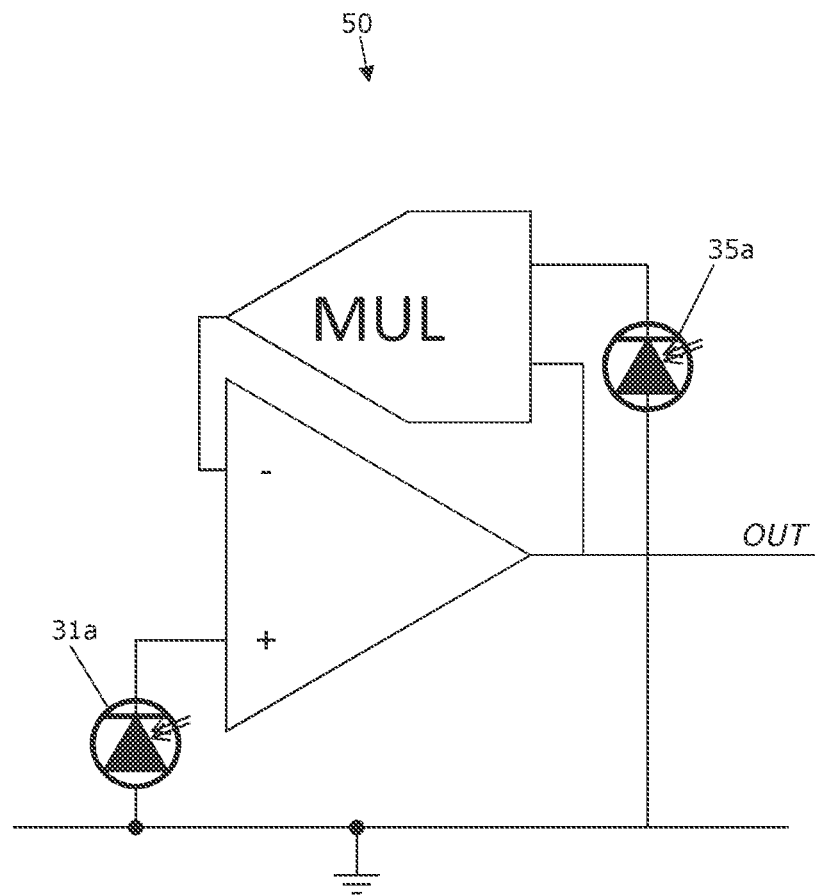
FIG. 2 shows compensation circuitry of one of the receivers.

The compensation circuitry 50 shown in FIG. 2 comprises analogue circuitry including a divider circuit made from an inverted multiplier. Resistors are omitted from FIG. 2.

The beamsplitters 34a, 34b, have a ratio of gains Ra and Rb respectively. Ra can be equal or different to Rb, however, it is assumed in the following equations that Ra is equal to Rb which corresponds to the ratio R. R is the ratio (normalised) of light diverted to the reference light sensor 35a, 35b compared to the light diverted to the slope filter 30b, 30b, so that for light that diverts in a 60%:40% ratio R would be 1.5.

Note that if $I_{ref}$ is the intensity of the reference beam and $I_{sig}$ is the intensity of the measurement beam, then $I_{ref}=RI_{sig}$.

G is the gain provided by the slope filter at the reflected wavelength. The relationship between the reference light sensor 35a which measures the intensity $P_A$ before the slope filter and the photodiode 31a which measures the attenuated intensity after the slope filter (called $P_\lambda$) is shown below:

$$P_\lambda = \frac{GP_A}{R}$$

Using this relationship, the output OUT of the compensation circuit 50 can be found:

$$OUT = \frac{P_\lambda}{P_A} = \frac{GP_A}{RP_A} = \frac{G}{R}$$

For linear slope:

$$G = \frac{(\lambda_a - \lambda_{a(min)})}{(\lambda_{a(max)} - \lambda_{a(min)})}$$

The equation for G is true if we assume the slope filter is linear with a gain positively proportional to the position of the wavelength in the range [$\lambda_{a(min)}$, $\lambda_{a(max)}$]. This should be noted as an example, and can be replaced with any gain function provided the transform is unique and the relationship between gain and wavelength is well known.

Using this equation for G, an equation for OUT can be formed omitting the symbol G:

$$OUT = \frac{(\lambda_a - \lambda_{a(min)})}{R(\lambda_{a(max)} - \lambda_{a(min)})}$$

Since R, $\lambda_{a(min)}$ and $\lambda_{a(max)}$ are fixed values, this gives an output directly proportional to the wavelength regardless of the optical efficiency of the circuit.

Throughout the above equations, the assumption is made that all photodiodes 31a, 31b, 35a, 35b, have a good linearity and similar characteristics. Irregularities, mismatched photodiodes, or gain increases can be made easily with a constant multiplier stage or analogue filter. In practise it is likely that the photodiodes 31a, 31b, 35a, 35b, would be matched and any non-linearity negligible in a typical design (particularly with a short wavelength range). In this case it can be considered that $$P_A = \frac{RP_\lambda}{G}.$$

In the example of FIG. 1 the number of optical sensors is the same as the number of drop de-multiplexers (in other words, there are two FBG sensors 1a, 1b and two de-multiplexers 21, 21b). This principle can be extended so that the system has three or more optical sensors, each having a dedicated de-multiplexer.

In an alternative embodiment, the last de-multiplexer in the chain may be omitted so that if there are N FBG sensors then there are only N−1 drop de-multiplexers. Specifically, in the case of FIG. 1, the second drop de-multiplexer 21b can be omitted, and the second receiver 20b connected to directly to the first de-multiplexer fibre grating 24a so that it receives all of the light transmitted by the first de-multiplexer fibre grating 24a.

Light 37 which is not reflected by the fibre grating of the last de-multiplexer in the chain is either transmitted to the last receiver (in the example of N−1 drop de-multiplexers mentioned above) or absorbed by a non-reflective termination (not shown).

Other types of de-multiplexers can be used other than drop de-multiplexers 21a, 21b. For example, there are several types of interferometric de-multiplexers that could be used. The drop de-multiplexors 21a, 21b of FIG. 1 have a usually superior gain regularity of the band drop wavelengths, therefore it is preferable if using a linear slope for a simple proportional response.

The wavelength-division multiplexing optical sensor system shown in FIGS. 1 and 2 may be used in a variety of applications. As noted above, each FBG sensor 1a, 1b may measure strain, temperature, pressure, or any other parameter. In some applications, each FBG sensor 1a, 1b independently measures a respective different parameter (for instance FBG sensor 1a measures pressure and FBG sensor 1b measures temperature). In other applications, each FBG sensor 1a, 1b independently measures the same parameter at a different location (for instance FBG sensor 1a measures temperature at one location and FBG sensor 1b measures temperature at another location). In other applications, some of the FBG sensors may be used only for compensation purposes rather than providing independent measurements. For instance FBG sensor 1a measures pressure and FBG sensor 1b measures temperature which is used to compensate the pressure reading from the other FBG sensor 1a.

Where accurate measurements are not required, then the compensation systems 34a, 34b, 35a, 35b, 50 may be omitted. Applications in which accurate measurements are required (and hence the compensation system is useful) include high speed temperature correction, or stable differential measurement (for instance one pressure sensor each side of a hydraulic piston to measure force needing very synchronised pressure measurements).

It should be noted that all of the circuitry shown in FIGS. 1 and 2 is analogue circuitry. Compared with digital circuitry, analogue circuitry is faster, less affected by radiation effects such as Single Event Upsets (SEUs), and can be directly integrated in analogue control loops. Analogue circuits typically have a much higher mean time between failures (MTBF) and are easier to test. In addition, they are not limited by processing power and sample speeds but only electrical propagation times and bandwidths, allowing nearly instantaneous and continuous signal processing at a lower power when compared to a fast microprocessor. This means processing of highly variable signals such as high speed motor synchro or vibrations faster than 100 MHz are possible. It can also be used to detect very fast behaviours and transients which can be missed by digital systems which spend most of the time performing the spectral analysis algorithms, rather than sampling. Analogue circuits also have a negligible start-up time or latency and the results can be ready within microseconds of power on, rather than the seconds for some digital computers.

More specific applications of the invention will now be described with reference to FIG. 3-6.

Figure 3:
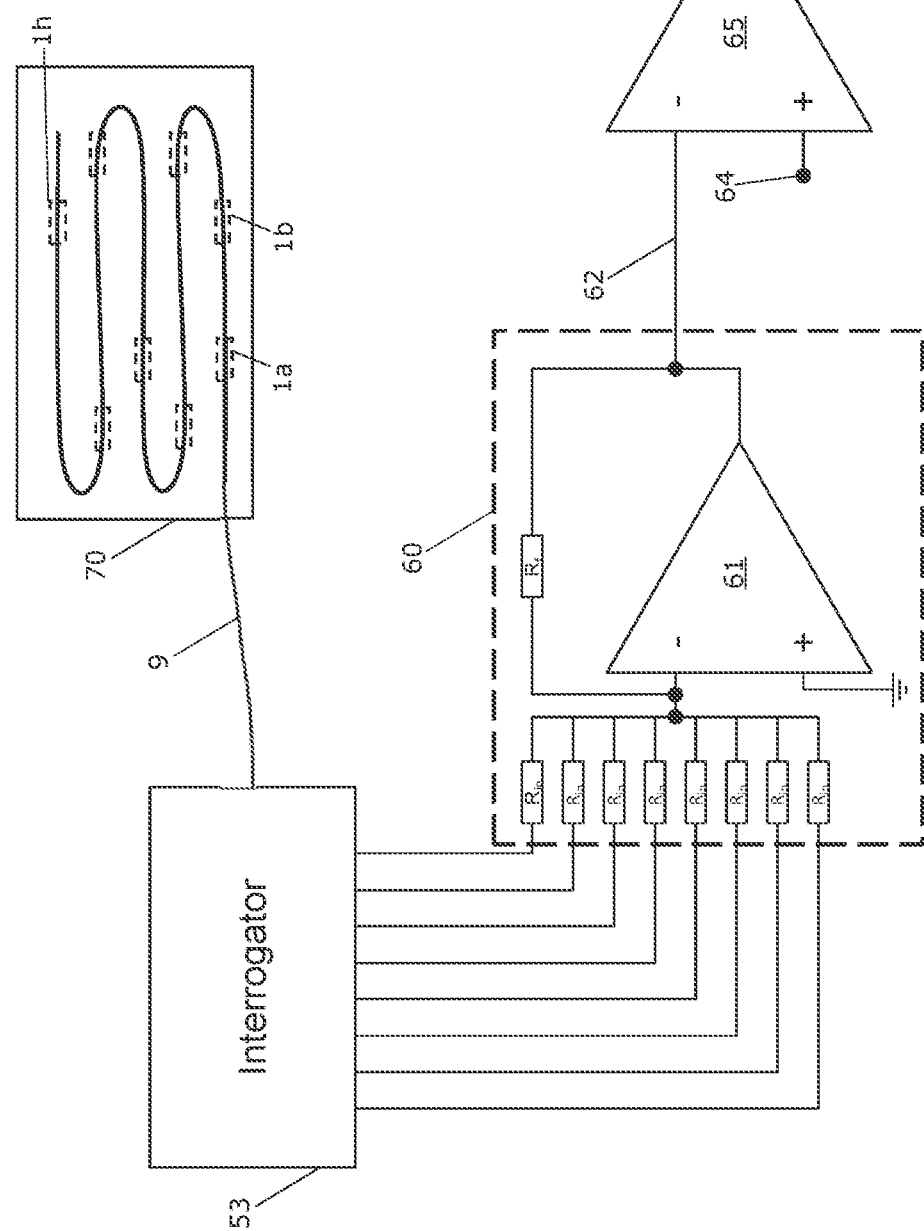
FIG. 3 shows a ventilation monitoring system.

A first specific application is in a large area/volume ventilation monitoring system shown in FIG. 3. Detection of local overheat within a large area/volume is a challenge because temperature sensors take space and wiring. FBG-based temperature sensors are of interest because it is possible to integrate a large number of such sensors on a single optical fibre due to the small size of the sensors. However, large number of FBGs often slows down the detection speed of a digital interrogator, or requires a very high performance digital interrogator to get a suitable sample rate.

Figure 4:
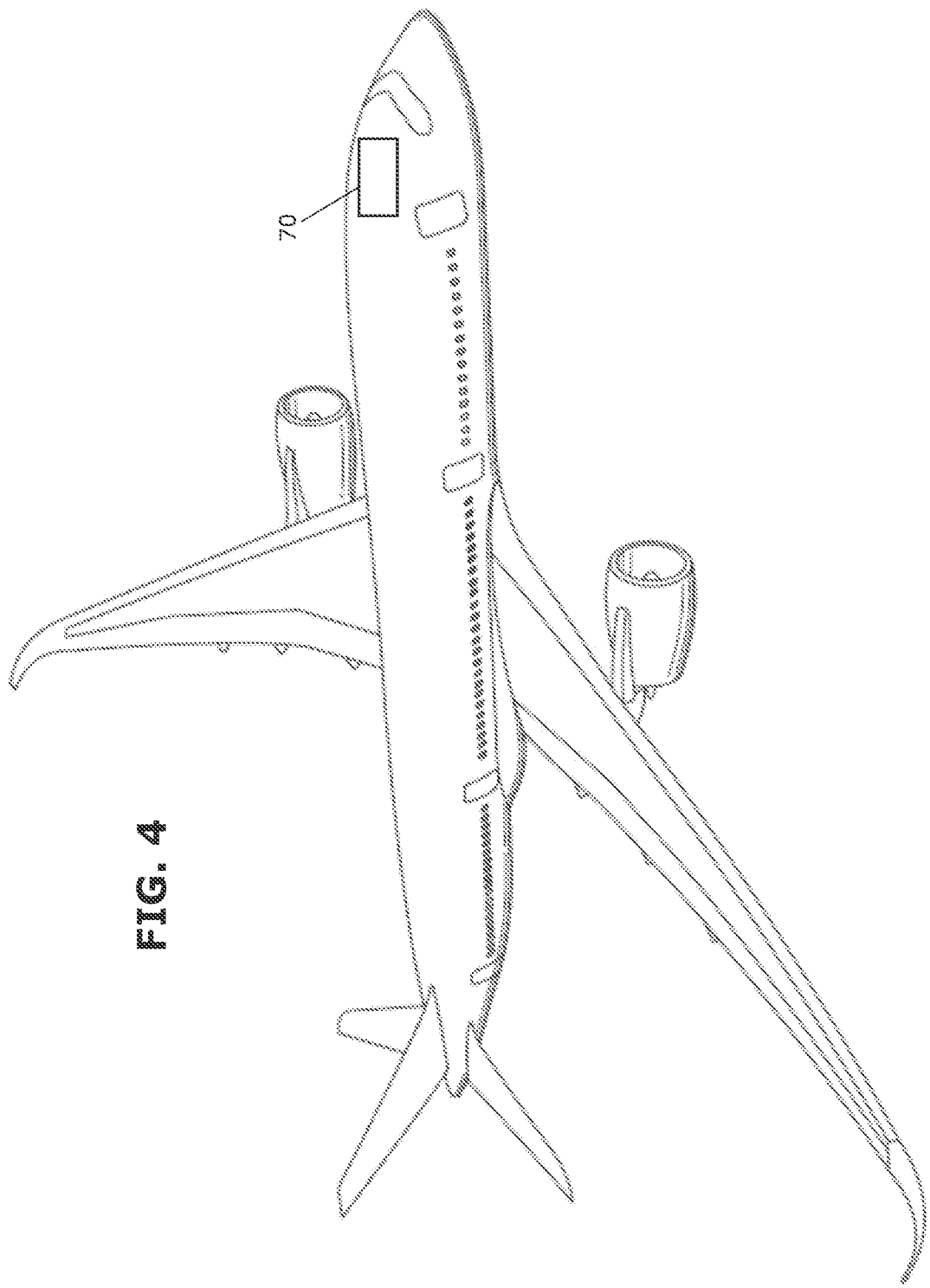
FIG. 4 shows an aircraft.

FIG. 3 shows a single interrogation optical fibre 9 (corresponding with the interrogation optical fibre 9 in FIG. 1) connected in series with a chain of eight FBG sensors 1a, 1b . . . 1h (corresponding with FBG sensors 1a, 1b in FIG. 1) positioned above each piece of equipment in an avionics bay 70 of an aircraft shown in FIG. 4. The single interrogation optical fibre 9 leads to an interrogator 53 which contains a light source, eight de-multiplexers and eight receivers arranged as shown in FIG. 1. These elements of the interrogator 53 are not shown for purposes of clarity.

The eight compensated outputs from the interrogator 53 are sampled in parallel and directly fed into analogue logic. The analogue logic comprises a summing amplifier 60 (an operation amplifier 61 and arrangement of resistors $R_{in}, R_f$) which gives an output 62 that is a summation of all the inputs. The output 62 is then compared to a threshold voltage 64 via a comparator 65. The output of this arrangement is a ventilation failure signal 66 which would allow detection of general overheat within the avionics bay 70, as well as a single hotspot or moderate overheat of two sensors (such as would happen if there is an overheat between two sensors). This can allow extremely fast response to both isolated and wide reaching overheats depending on the specific need. Other analogue "functions" for isolating, or biased detection are also possible including combinations of multiple functions.

Figure 5A:
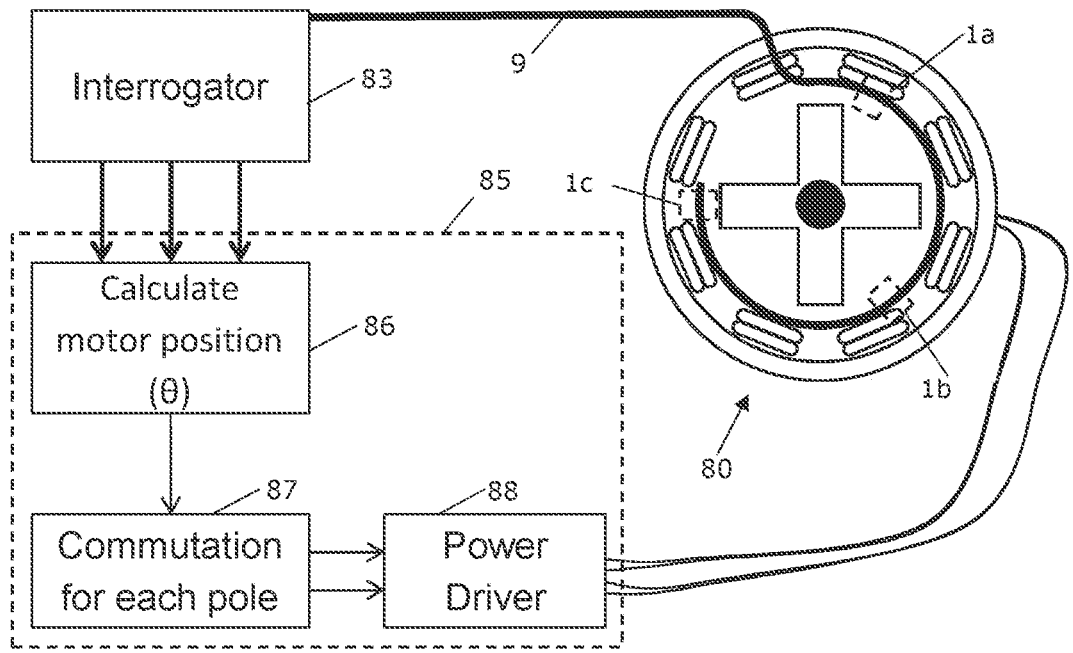
FIG. 5a shows a DC brushless motor and associated control system.
Figure 5B:
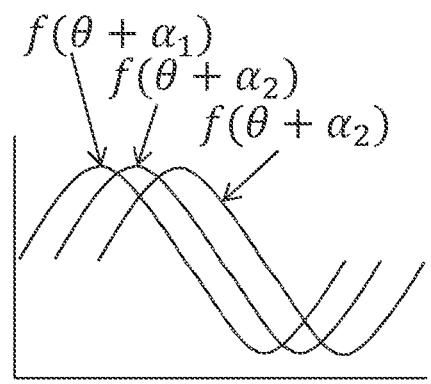

A second specific application is in a high frequency motor synchro control system as shown in FIGS. 5a and 5b. The system of FIGS. 5a and 5b may be part of the aircraft of FIG. 4.

FIG. 5a shows a DC brushless motor 80 with an interrogation optical fibre 9 (corresponding with the interrogation optical fibre in FIGS. 1 and 3) connected to FBG sensors 1a, 1b, 1c (corresponding with the FBG sensors 1a, 1b in FIGS. 1 and 3) distributed around the core of the motor 80. The interrogation optical fibre 9 is connected to an interrogator 83 which contains a light source, three de-multiplexers and three receivers arranged as shown in FIG. 1. These elements of the interrogator 83 are not shown for purposes of clarity.

The three outputs of the interrogator 83 represent feedback from the operation of the DC brushless motor 80. A controller 85 is arranged to control the operation of the DC brushless motor 80 based on the feedback. The controller 85 comprises a motor position circuit 86 that calculates motor position (using a standard algorithm that can be implemented using off-the-shelf chips) and outputs the motor position into a motor control circuit 87 and power driver circuit 88.

The FBG sensors 1a, 1b, 1c in the example of FIG. 5a are all coated in a magnetostrictive material (magneto constrictive coating). Magnetostriction is a property of ferromagnetic materials that causes them to change their shape or dimensions during the process of magnetization. The FBG sensors 1a, 1b, 1c, coated in the magnetostrictive material will experience a strain during the process of magnetization as the material tries to change shape or dimension. Thus the sensors 1a, 1b, 1c, will sense a strain caused by the magnetic field as the pole pieces pass the sensors 1a, 1b, 1c. This strain can be visualised by FIG. 5b, which shows each sensor seeing the same signal with a different phase $\alpha 1$, $\alpha 2$, $\alpha 3$ letting the absolute phase be calculated.

Commutation of motors was previously a major use of synchro control, however, high speed motors saw difficulties due to the synchro speed. The interrogator 83 scanning the frequency bands of each of the wavelengths gives multiple signals, similar to a regular synchro resolver. However, compared to a regular resolver, the "excitation frequency" of light exceeds any electrical excitation, allowing it to support very high speed motors.

Figure 6:
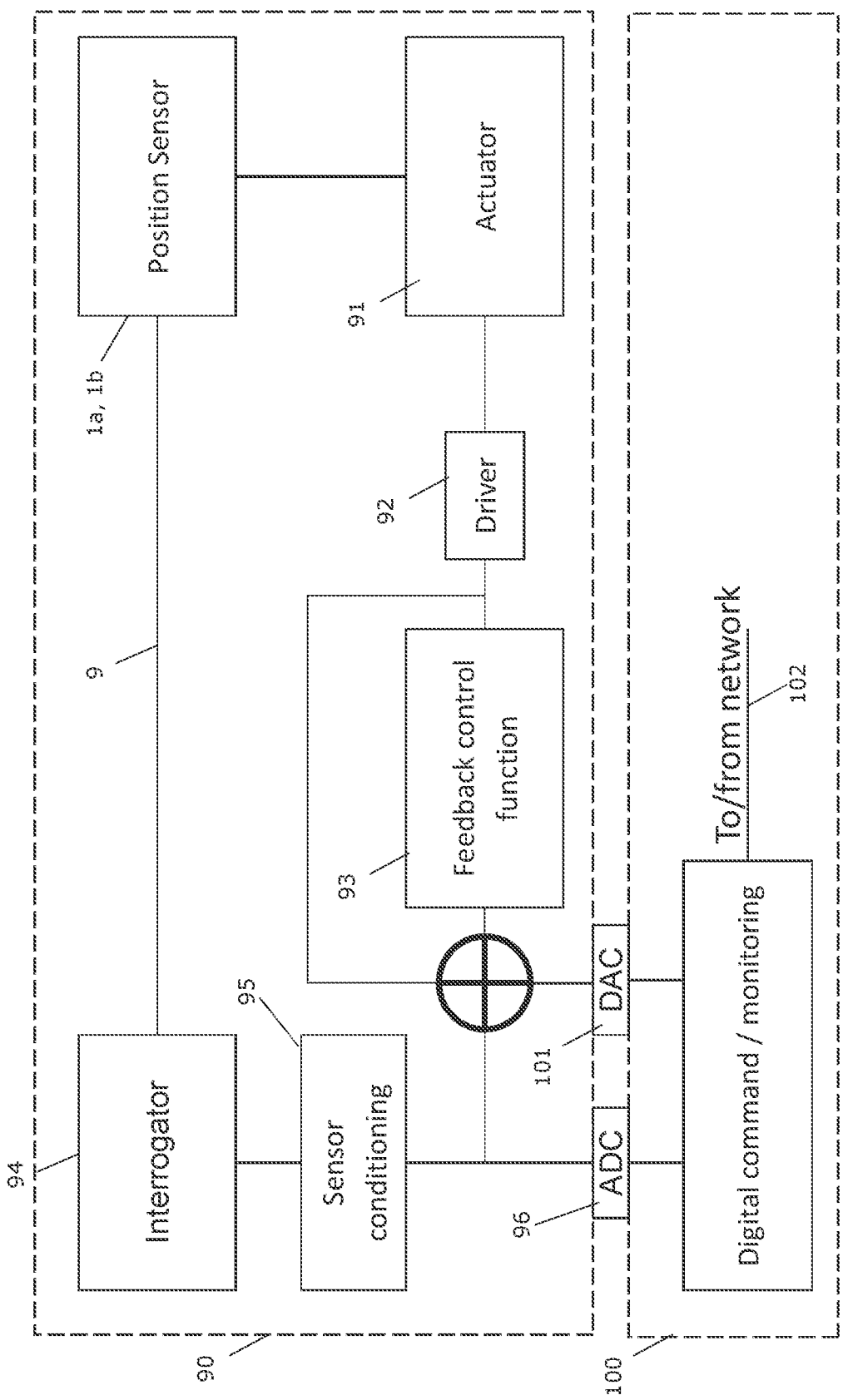
FIG. 6 shows an analogue control, digital command system.

A third specific application is in an analogue control, digital command system as shown in FIG. 6. The system of FIG. 6 may be part of the aircraft of FIG. 4.

The system of FIG. 6 is split into two parts: a high speed analogue part 90 to allow closed loop control and a low speed digital part 100 to command and monitor the system without large processor demands.

The digital part 100 provides a command input to the analogue part 90 via a digital to analogue converter (DAC) 101. The analogue part 90 comprises an actuator 91 and driver 92 controlled by a feedback control function 93.

FBG position sensors 1a, 1b measure the position of the actuator 91, and an interrogator 94 provides a feedback input into the feedback control function 93 via sensor conditioning circuitry 95.

Typically commands from the DAC 101 are much slower than the closed loop feedback control function 93, and this allows a very high speed control loop without requiring the same performance from the digital part 100.

The analogue outputs from the sensor conditioning circuitry 95 are converted to digital outputs by an analogue to digital converter (ADC) 96 connected to the digital part 100. This enables the digital part 100 to communicate the position of the actuator 91 to a digital monitoring system (not shown) via a network 102.

Figure 7:
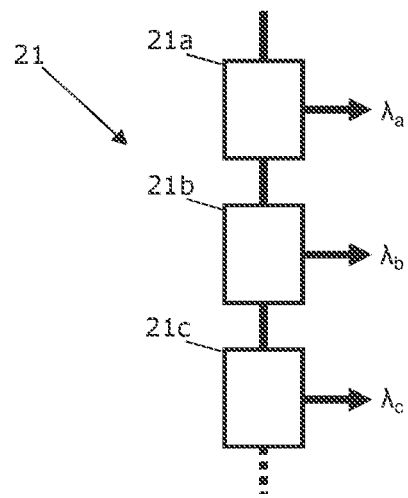
FIG. 7 is a schematic view of an optical de-multiplexing system with a chain of de-multiplexers.

FIG. 7 is a schematic view of an optical de-multiplexing system 21 which is identical to the optical de-multiplexing system 21 of FIG. 1 except that it includes a third drop-de-multiplexer 21c. The optical de-multiplexing system 21 comprises three drop de-multiplexers 21a, 21b, 21c arranged in a chain. Each drop de-multiplexer is tuned to the wavelength characteristic of an associated one of the sensors and arranged to route light with that wavelength characteristic to an associated one of the receivers. The light which is not routed to one of the receivers (i.e. not reflected by one of the de-multiplexer fibre gratings 24a, 24b) is transmitted to the next drop de-multiplexer in the chain.

Figure 8:
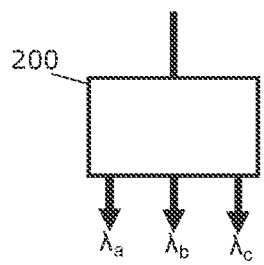
FIG. 8 is a schematic view of an optical de-multiplexing system with a single de-multiplexer.

An alternative optical de-multiplexing system is shown in FIG. 8. In this case the optical de-multiplexing system consists of a single de-multiplexer 200 which receives light from three optical sensors on a single optical fibre, and routes light from each of the optical sensors to an associated one of the receivers based on a wavelength $\lambda a$, $\lambda b$, $\lambda c$ of the light. The de-multiplexer 200 is an interferometric device that splits light into wavelengths and then guides it into separate fibres physically. Such an optical de-multiplexing system 200 may be used in the apparatus of FIG. 1 as a substitute for the optical de-multiplexing system 21 based on a chain of drop de-multiplexers.

Figure 9:
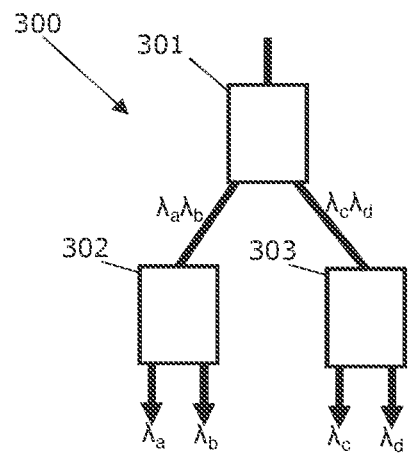
FIG. 9 is a schematic view of an optical de-multiplexing system with a cascaded topography of de-multiplexers.

A further alternative optical de-multiplexing system 300 is shown in FIG. 9. In this case the optical de-multiplexing system 300 comprises a cascaded topology of de-multiplexers 301, 302, 303 which each split the incoming light into two separate paths based on wavelength of the light. Such a system 300 may be used in the apparatus of FIG. 1 as a substitute for the optical de-multiplexing system 21 based on a chain of drop de-multiplexers.

In the embodiments described above, the receivers 20a, 20b etc are arranged to receive light 38 reflected back from the FBG sensors 1a, 1b etc via the interrogation optical fibre 9. In an alternative embodiment of the invention, the receivers 20a, 20b etc may instead be arranged to receive light 39 transmitted by the FBG sensors 1a, 1b etc with a spectrum 40. This leads to an inverted output—in other words the output of each receiver is inversely proportional to wavelength rather than directly proportional.

In another embodiment of the invention, it is possible to combine the two embodiments described above so that a first set of receivers 20a, 20b etc is arranged to receive light 38 reflected back from the FBG sensors 1a, 1b etc via the interrogation optical fibre 9, and a second set of receivers is arranged to receive light 39 transmitted by the FBG sensors 1a, 1b etc. This allows for more accurate measurements, and a more robust system since a failure in one of the sets of receivers would not cause the whole system to fail.

In the embodiments described above, the FBG sensors 1a, 1b etc are arranged in series in a chain, but in alternative embodiments of the invention they may be on stubs connected by circulators, or there may be splitters or a tree of optical fibres connecting the FBG sensors.

In the embodiments described above, optical fibres 2,9, 12,15a,15b,17,18 etc. are used to connect the optical elements of the system, but in an alternative embodiment some or all of these optical fibres may be replaced by waveguides or other means for transmitting light. For example the de-multiplexing system 21, 200, 300 may be embodied as an optical integrated circuit.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An optical sensor system comprising:
two or more optical sensors;
two or more receivers; and
an optical de-multiplexing system,
wherein each of the optical sensors comprises a fibre grating with a different wavelength characteristic,
each of the two or more receivers comprises:
  a slope filter;
  a light detector;
  a reference light sensor;
  a beam splitter arranged to split light routed to the receiver into a reference beam and a measurement beam, direct the reference beam onto the reference light sensor of the receiver, and direct the measurement beam onto the light detector of the receiver via the slope filter of the receiver; and
  an analogue compensation circuitry configured to generate a compensated output based on an output of the light detector of the receiver and an output of the reference light sensor of the receiver;
wherein each of the two or more receivers is associated with a respective one of the two or more optical sensors, and
the optical de-multiplexing system is arranged to route light from each of the two or more optical sensors to one of the two or more receivers associated with the optical sensor based on a wavelength of the light,
wherein the optical de-multiplexing system comprises two or more drop de-multiplexers arranged in series, and each of the drop de-multiplexers is tuned to a wavelength characteristic of an associated one of the optical sensors and arranged to route light with the wavelength characteristic to the receiver associated with the optical sensor.

2. The optical sensor system according to claim 1, wherein the optical de-multiplexing system comprises three or more of the drop de-multiplexers arranged in series in a chain, and each of the drop de-multiplexers is tuned to a wavelength characteristic of an associated one of the optical sensors and arranged to route light with the wavelength characteristic to the receiver associated with the optical sensor.

3. The optical sensor system according to claim 1, wherein the number of optical sensors is the same as the number of drop de-multiplexers.

4. The optical sensor system according to claim 1, wherein each of the drop de-multiplexers comprises a de-multiplexer fibre grating tuned to the wavelength characteristic of the associated one of the optical sensors.

5. The optical sensor system according to claim 1, wherein each of the drop de-multiplexers comprises a de-multiplexer fibre grating tuned to the wavelength characteristic of the associated one of the optical sensors and arranged to reflect light with the wavelength characteristic.

6. The optical sensor system according to claim 4, wherein each of the drop de-multiplexers comprises a circulator with a first port arranged to receive light from the optical sensors, a second port coupled to the associated one of the receivers, and a third port coupled to the de-multiplexer fibre grating.

7. The optical sensor system according to claim 1, wherein the analogue compensation circuitry comprises a divider circuit made of an inverted multiplier.

8. An optical sensor system comprising:
two or more optical sensors;
two or more receivers; and
an optical de-multiplexing system,
wherein each optical sensor comprises a fibre grating with a different wavelength characteristic,
each of the receivers comprises a slope filter and a light detector,
each of the receivers is associated with a respective one of the optical sensors, and
the optical de-multiplexing system is arranged to route light from each of the optical sensors to the receiver associated with the optical sensor based on a wavelength of the light,
wherein each of the receivers comprises: a reference light sensor, and a beam splitter which is arranged to split light routed to the receiver into a reference beam and a measurement beam, direct the reference beam onto the reference light sensor of the receiver, and direct the measurement beam onto the light detector of that receiver via the slope filter of the receiver,
wherein each of the receivers includes an analogue compensation circuitry configured to generate a compensated output based on an output of the light detector of the receiver and an output of the reference light sensor of the receiver.

9. The optical sensor system according to claim 8, wherein the analogue compensation circuitry comprises a divider circuit made of an inverted multiplier.

10. The optical sensor system according to claim 8, wherein the optical de-multiplexing system comprises two or more drop de-multiplexers arranged in series, and each of the drop de-multiplexers is tuned to the wavelength characteristic of an associated one of the optical sensors and arranged to route light with that wavelength characteristic to the receiver associated with the optical sensor.

11. The optical sensor system according claim 8, wherein each slope filter is tuned to the wavelength characteristic of a respective one of the optical sensors and the slope filters are tuned to different wavelength characteristics.

12. An optical sensor system comprising:
two or more optical sensors;
two or more receivers; and
an optical de-multiplexing system,
wherein each of the optical sensors comprises a fibre grating with a different wavelength characteristic,
each of the receivers comprises:
a slope filter;
a light detector;
a reference light sensor, and
a beam splitter configured to split light routed to the receiver into a reference beam and a measurement beam, direct the reference beam to the reference light sensor of that receiver, and direct the measurement beam to the light detector of the receiver via the slope filter of the receiver and,
analogue compensation circuitry configured to generate a compensated output based on an output of the light detector of that receiver and an output of the reference light sensor of that receiver;
wherein each of the two or more receivers is associated with a respective one of the two or more optical sensors, and
wherein the optical de-multiplexing system is arranged to route light from each of the optical sensors to the receiver associated with the optical sensor based on a wavelength of the light, and
wherein each of the slope filters is tuned to the wavelength characteristic of a respective one of the optical sensors and the slope filters are tuned to different wavelength characteristics.

13. The optical sensor system according to claim 12, wherein each of the slope filters attenuates light based on a wavelength of the light and a wavelength gain function.

14. The optical sensor system according to claim 12, wherein each of the slope filters attenuates light based on a wavelength of the light and a wavelength gain function, and the wavelength gain functions have different passbands.

15. The optical sensor system according to claim 12, further comprising a light source arranged to generate light; and an interrogation optical fibre arranged to transmit the light from the light source to the optical sensors, wherein the optical sensors are connected in series to the light source.

16. The optical sensor system according to claim 15, wherein the light source is arranged to continuously generate light with a substantially constant intensity, and the interrogation optical fibre is arranged to continuously transmit the light with a substantially constant intensity from the light source to the optical sensors.

17. The optical sensor system according to claim 12, wherein each of the receivers generates an analogue output.

18. An aircraft comprising the optical sensor system according to claim 12.

19. A control system comprising: a motor or actuator; the optical sensor system according to claim 12, arranged to monitor or measure the motor or actuator and generate a feedback signal; and a controller arranged to control operation of the motor or actuator based on the feedback signal.

* * * * *